(12) United States Patent
Abhishek et al.

(10) Patent No.: US 12,375,636 B2
(45) Date of Patent: Jul. 29, 2025

(54) GENERATING HOLOGRAPHIC OR LIGHTFIELD VIEWS USING CROWDSOURCING

(71) Applicant: Tencent America LLC, Palo Alto, CA (US)

(72) Inventors: Rohit Abhishek, Palo Alto, CA (US); Arianne Hinds, Palo Alto, CA (US); Stephan Wenger, Hillsborough, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 141 days.

(21) Appl. No.: 17/970,956

(22) Filed: Oct. 21, 2022

(65) Prior Publication Data

US 2023/0128826 A1  Apr. 27, 2023

Related U.S. Application Data

(60) Provisional application No. 63/275,108, filed on Nov. 3, 2021, provisional application No. 63/270,984, filed on Oct. 22, 2021.

(51) Int. Cl.
*G06T 17/00* (2006.01)
*H04N 13/282* (2018.01)

(52) U.S. Cl.
CPC .......... *H04N 13/282* (2018.05); *G06T 17/00* (2013.01)

(58) Field of Classification Search
CPC .................................................. G06T 17/00
See application file for complete search history.

(56) References Cited

U.S. PATENT DOCUMENTS

| | | | |
|---|---|---|---|
| 5,495,576 | A | 2/1996 | Ritchey |
| 5,850,352 | A | 12/1998 | Moezzi et al. |
| 2004/0104935 | A1 | 6/2004 | Williamson et al. |
| 2017/0010584 | A1 | 1/2017 | Kim |
| 2019/0026956 | A1 | 1/2019 | Gausebeck et al. |

FOREIGN PATENT DOCUMENTS

| | | |
|---|---|---|
| JP | 2000-89651 A | 3/2000 |
| JP | 2009-135686 A | 6/2009 |
| JP | 2019-532535 A | 11/2019 |
| JP | 2021-64822 A | 4/2021 |
| KR | 10-2017-0002694 A | 1/2017 |

OTHER PUBLICATIONS

International Search Report dated Mar. 1, 2023 in International Application No. PCT/US22/47500.

(Continued)

*Primary Examiner* — Y Lee
(74) *Attorney, Agent, or Firm* — Sughrue Mion, PLLC

(57) ABSTRACT

Method, device, and non-transitory storage medium for generating crowdsourced holographic views are provided. The method may include receiving one or more images of a same scene from one or more imaging devices, where each of the one or more imaging devices is at different locations. The method may further include generating a 3D model of the same scene based on the one or more images and streaming immersive media for rendering a holographic display of the same scene based on the 3D model based on determining that a display device is capable of displaying immersive media.

17 Claims, 8 Drawing Sheets

(56) References Cited

OTHER PUBLICATIONS

Written Opinion dated Mar. 1, 2023 in International Application No. PCT/US22/47500.
Communication issued Sep. 10, 2024 from Japanese Patent Office in Japanese Application No. 2023-565468.
Japanese Office Action dated Mar. 18, 2025 in Application No. 2023-565468.
Korean Office Action dated Apr. 21, 2025 in Application No. 10-2023-7037733.

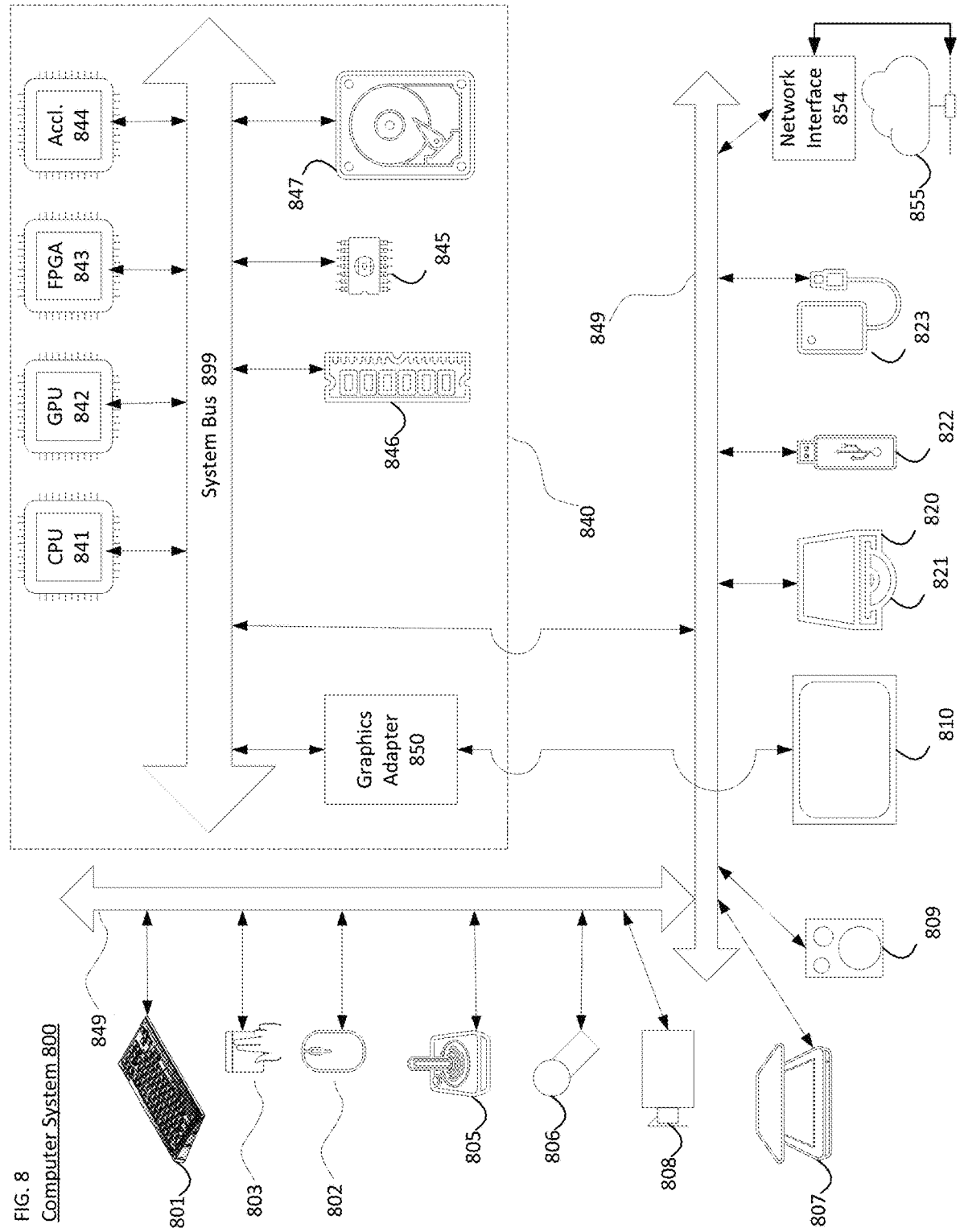

GENERATING HOLOGRAPHIC OR LIGHTFIELD VIEWS USING CROWDSOURCING

CROSS-REFERENCE TO RELATED APPLICATION

This application claims priority from U.S. Provisional Patent Application No. 63/270,984, filed on Oct. 22, 2021, and U.S. Provisional Patent Application No. 63/275,108, filed on Nov. 3, 2021, in the United State Patent and Trademark Office, the disclosures of which are incorporated herein by reference in their entireties.

FIELD

Embodiments of the present disclosure relate to image and video coding technologies. More specifically, embodiments of the present disclosure relate to improvements generating media content for holographic display or lightfield displays using crowdsourcing.

BACKGROUND

Immersive media relates to immersive technologies that attempt to create or imitate the physical world through digital simulation, often simulating any or all human sensory systems to create the perception that the user is physically present inside a scene.

Immersive media technologies may include Virtual Reality (VR), Augmented Reality (AR), Mixed Reality (MR), Light Field/Holographic, etc. VR refers to a digital environment replacing the user's physical environment by using a headset to place the user in a computer-generated world. AR takes digital media and layers them on the real world around you by using either a clear vision or a smartphone. MR refers to blending the real world with the digital world, creating an environment where technology and the physical world can co-exist.

Lightfield display or Holographic display technologies consist of light rays in 3D space with rays coming from each point and direction. Light rays may be five-dimensional plenoptic functions, where each beam may be defined by three coordinates in 3D space (3 dimensions) and two angles to specify the direction in 3D space. The concept of lightfield displays is based on the understanding that everything seen around is illuminated by light coming from any source, traveling via space and hitting the surface of the object where the light is partly absorbed and partly reflected to another surface before reaching our eyes. What exact light rays reach our eyes depends on the user's precise position in the light field, and as the user moves around, the user perceives part of the light field and uses that to get an idea about the object's position.

To capture the content for 360-degree video, a 360-degree camera is required; however, when it comes to capturing content for lightfield/holographic displays, an expensive setup comprising of multiple depth cameras or an array of cameras is required depending on the FoV of the scene to be rendered. A traditional camera can only capture a 2D representation of the light rays that reach the camera lens at a given position. The image sensor records the sum of the brightness and color of all light rays reaching each pixel but not the direction of all light rays reaching the camera sensors. Thus, devices specifically designed to capture content for lightfield/holographic displays are cost prohibitive.

SUMMARY

According to embodiments, a method for generating crowdsourced holographic views may be provided. The method may be executed by at least one processor an may include receiving, from one or more imaging devices, one or more images of a same scene, wherein each of the one or more imaging devices is at different locations; generating a 3D model of the same scene based on the one or more images; and based on determining that a display device is capable of displaying immersive media, streaming immersive media for rendering a holographic display of the same scene based on the 3D model.

According to embodiments, an apparatus for generating crowdsourced holographic views may be provided. The apparatus may include at least one memory configured to store program code; and at least one processor configured to read the program code and operate as instructed by the program code. The program code may include receiving code configured to cause the at least one processor to receive, from one or more imaging devices, one or more images of a same scene, wherein each of the one or more imaging devices is at different locations; first generating code configured to cause the at least one processor to generate a 3D model of the same scene based on the one or more images; and streaming code configured to cause the at least one processor to stream immersive media for rendering a holographic display of the same scene based on the 3D model based on determining that a display device is capable of displaying immersive media.

According to embodiments, a non-transitory computer-readable medium storing instructions may be provided. The instructions, when executed by at least one processor of a device generating crowdsourced holographic views may cause the at least one processor to receive, from one or more imaging devices, one or more images of a same scene, wherein each of the one or more imaging devices is at different locations; generate a 3D model of the same scene based on the one or more images; and based on determining that a display device is capable of displaying immersive media, stream immersive media for rendering a holographic display of the same scene based on the 3D model.

BRIEF DESCRIPTION OF THE DRAWINGS

FIG. 8 is a diagram of a computer system, according to an embodiment of the present disclosure.

DETAILED DESCRIPTION

Aspects of the disclosed embodiments may be used separately or in combination. Embodiments of the present disclosure relate to improvements in generating holographic views using crowdsourced images that do not require expensive lightfield camera setup.

Holographic/light field technology creates a virtual environment with an accurate sense of depth and three-dimensionality without the need to use any headset and therefore avoid side effects like motion sickness. As stated above, to capture the content for 360-degree video, a 360-degree camera is required; however, when it comes to capturing content for lightfield or holographic displays, an expensive setup comprising of multiple depth cameras or an array of cameras is required depending on the field of view (FoV) of the scene being captured.

According to an embodiment of the present disclosure, crowdsourcing techniques may be used to capture real-world content for lightfield or holographic displays. The captured content, once aligned appropriately, may be used to create a 3D model, which the holographic displays or multi-view displays can use to render the scene.

According to an embodiment, more than one imaging device (also referred to a capture device or capturing device) may be placed at more than one random positions or locations may be used to capture multiple views of the same scene. In some embodiments, the imaging device location may be limited by the device's distance from the scene to be captured.

According to an embodiment, the above-mentioned imaging devices may include but not be limited to cameras, digital cameras, smartphone cameras, or any device with a camera capable enough to capture the video/image with a minimum defined resolution. The minimum defined resolution may be pre-defined or may be defined by the client device capturing the scene. In some embodiments, the more than one imaging devices may be time-synchronized. As an example, when trying to capture a static rigid body, since there is no movement, there may not be a requirement to ensure that the captures are taken at the same time. As another example, in the case of dynamic scenes/objects, synchronization while capturing the scene may be needed from all capturing devices to reconstruct the form and position of each object in the scene at any instance in time. In some embodiments, time offsets for frames may be used in case of lack of synchronization.

According to an example, a server or a media distribution server may receive the capture media from all the capturing devices and may use image alignment or non-rigid registration to align different views captured by multiple cameras placed at any random distance. Alignment may be done by aligning different but similar objects/people's faces captured at different viewing angles and distances to create multiple views.

Figure 1:
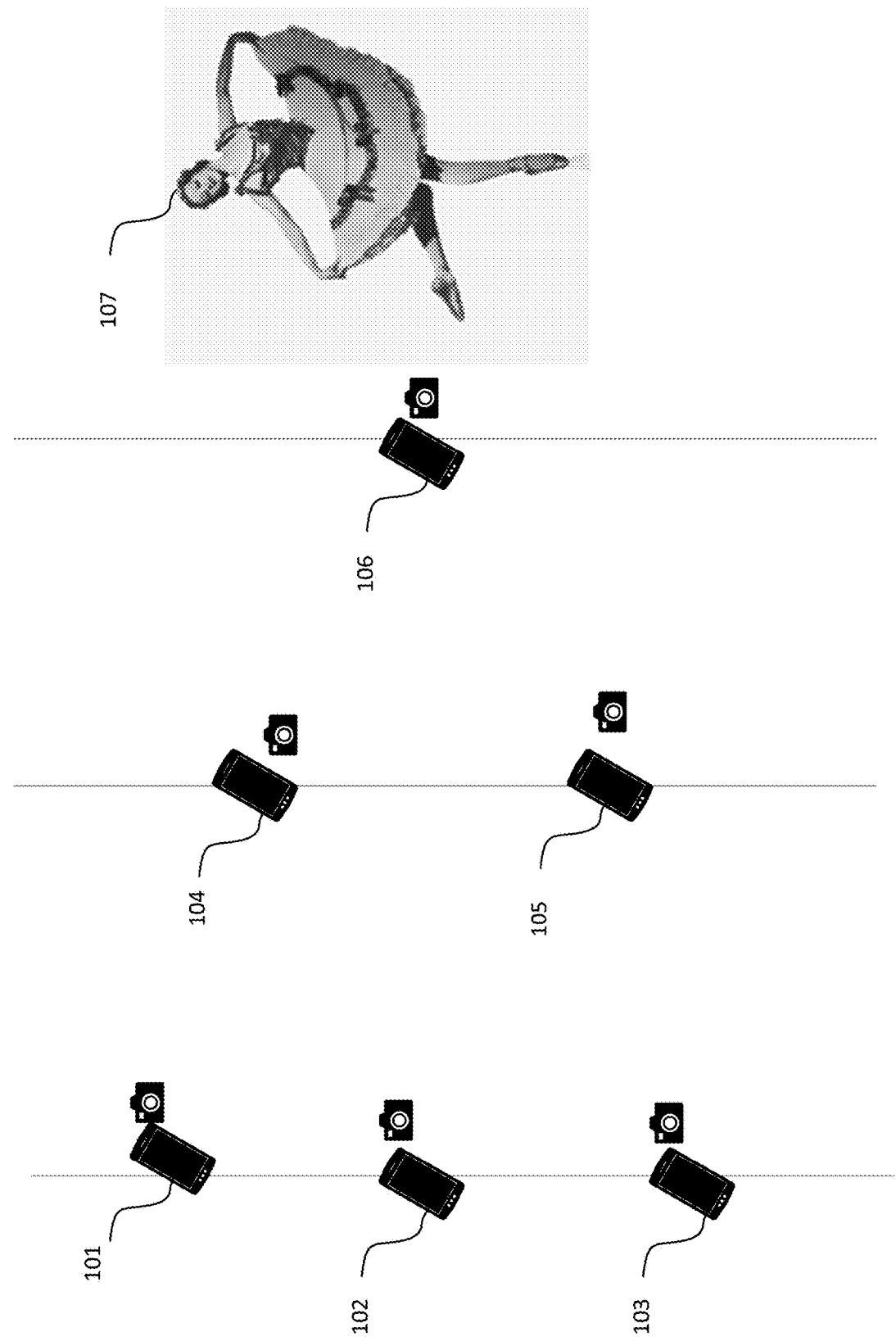
FIG. 1 illustrates an exemplary arrangement of crowdsourced imaging devices to capture a scene, according to an embodiment of the present disclosure.

FIG. 1 illustrates an exemplary arrangement 100 of crowdsourced imaging devices capturing a same scene.

As shown in FIG. 1, imagining devices 101-106 may be used to capture scene 107. It may be understood that the imaging devices 101-106 are different imaging devices and are positioned and/or located are varying angles and distances from the scene 107.

It may be understood that while FIG. 1 shows the position in space of each of the imaging devices 101-106 in only two one dimensions, a person skilled in the art will appreciate that a third dimension can trivially also be derived from position sensors such as GPS or a combination of geomagnetic field sensor with the accelerometer to determine the capture device's position relative to the magnetic north pole.

Similarly, it may be understood that a handheld device, with or without image stabilization, may move, but such movement in both space and orientation can be recorded while the video is recorded in a time-synchronized manner so as to avoid any model deformation. As another example, it may be understood that rotation motion of the imaging devices may also be taken into consideration and compensated for while the video is recorded in a time-synchronized manner so as to avoid any model deformation.

According to an embodiment, for real-time video captures, the synchronization may be achieved by synchronizing the captures (this may be achieved by a common hardware trigger), and/or by avoiding any delay in delivering the frames from the capture device to the server. For pre-recorded content, the capture devices may not be synchronized in their capture time but may produce a continuous stream of video, which may use a 64-bit timestamp to process such stream in a way that an interpolated captured scene may be created at a common clock inside the capture device (imaging device 101 for example) or in the server or media distribution server. In some embodiments, the imaging devices may use a centralized Network Time Protocol server to prevent the capture device's clock from drifting and going out of sync.

According to an aspect of the present disclosure, imaging devices, such as cell phones, may include not only a camera with configurable/known optical geometry but also sensors (hardware or software-based to measure parameters such as geomagnetic field, gyroscope, accelerometer, gravity, linear acceleration, rotation vector, significant motion, step counter, step detector . . . etc.) that may be used to identify the position of the imaging device in space and time, including position, orientation, and motion. To determine the position of an imaging device, two sensors, commonly found in cell phones, may be used: geomagnetic field sensor and the accelerometer. In some embodiments, a proximity sensor may be used based on the distance of the imaging device from an object may be determined. The orientation of the imaging device may be read by using the imaging device's accelerometer and the geometric field sensor. Motion sensors monitors motion relative to the real world's frame of reference by measuring the device's movement, such as tilt, shake, rotation, or swing.

According to an aspect of the present disclosure, the server and/or media distribution processor may use different views captured to create a vector-format scene with polygonal representations of all objects in a scene and then match points with a similar description in a spatially coherent manner. Sampling few points in each image and then align these points and then interpolate them to the rest of the image. In an embodiment, the server and/or the media distribution processor may adjust the resolution of the captured image so that all capturing devices appear to be at the same distance from the scene if the camera is placed at a different distance from the scene.

According to an aspect of the present disclosure, the server and/or media distribution processor may align different images to reconstruct a 3D model of the scene by aligning and adjusting different captured images from different viewing angles. Once the 3D scene is recreated, the media may be distributed and/or stream by the server and/or the media distribution processor based on the display type of the end client. As an example, for legacy display devices, a raster 2D format may be generated. Therefore, single-camera capture is used at any time here. For more capable devices, especially devices with some or all capability for immersive media display, multi-view images may be generated (for ex . . . displays based on 30 views or 45 views) and transmitted.

Figure 2:
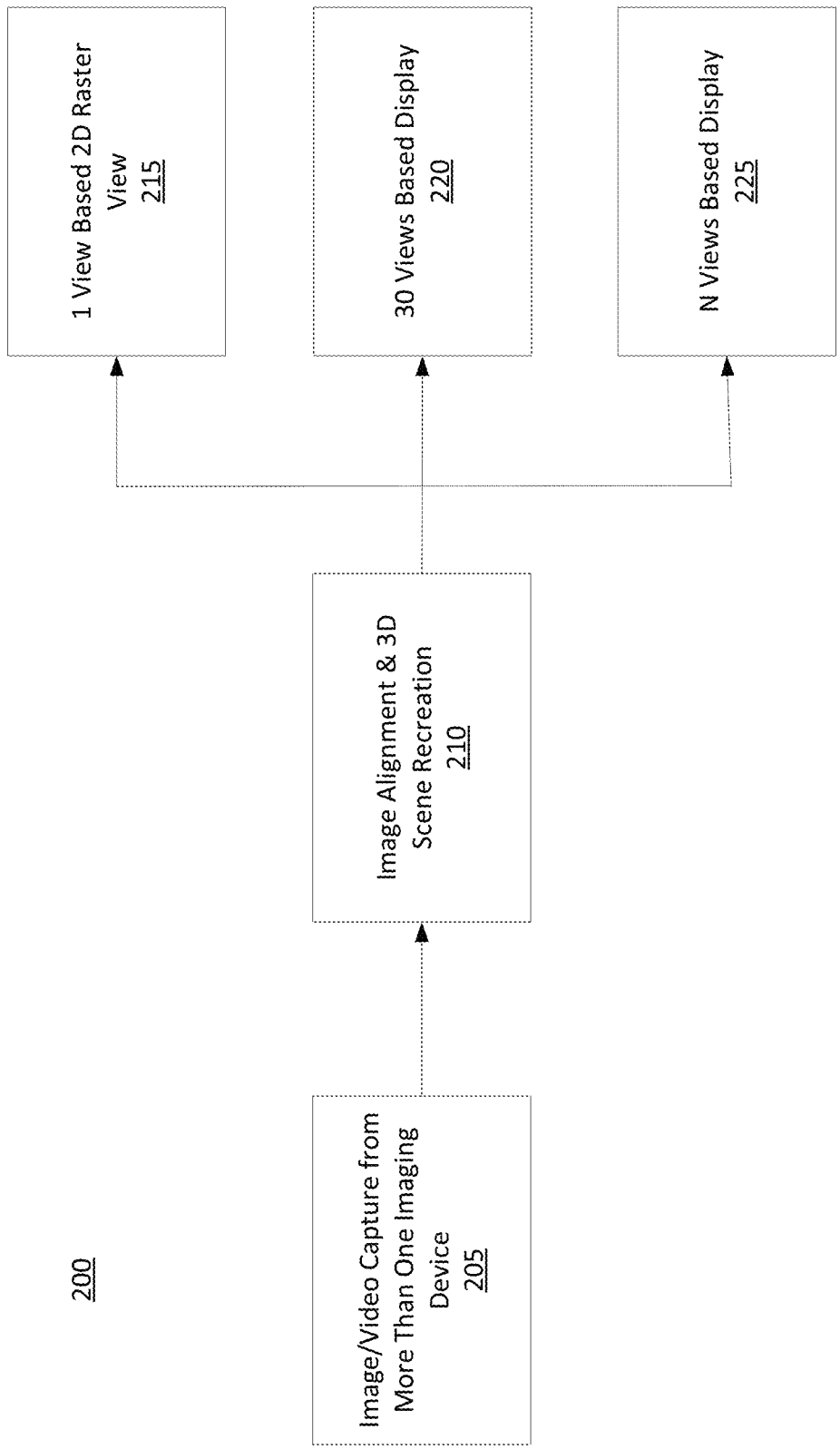
FIG. 2 illustrates a process for generating crowdsourced holographic views, according to an embodiment of the present disclosure.

FIG. 2 illustrates an exemplary workflow of a process 200 for generating crowdsourced holographic views.

As shown in process 200, at 205, the one or more imaging devices may capture the scene from a plurality of positions and/or locations, at varying distances and with different viewing angles.

At 210, the server or the media distribution processor may collect the captured images and preprocess the images, align the images, and generated a 3D representation of the scene.

At 215, based on determining that the end client device or the client device does not have the capability of rendering immersive media displays or holographic views, the server or the media distribution processor may transmit and/or stream a media stream that may be rendered as a 1 view 2D raster scan.

At 220 and 225, based on determining that the end client device or the client device does have at least some capability of rendering immersive media displays or holographic views, based on the capability of the end client or client device, the server or the media distribution processor may transmit and/or stream a media stream that may be rendered as a 30 view immersive holographic display or an appropriate N view immersive holographic display.

Figure 3:
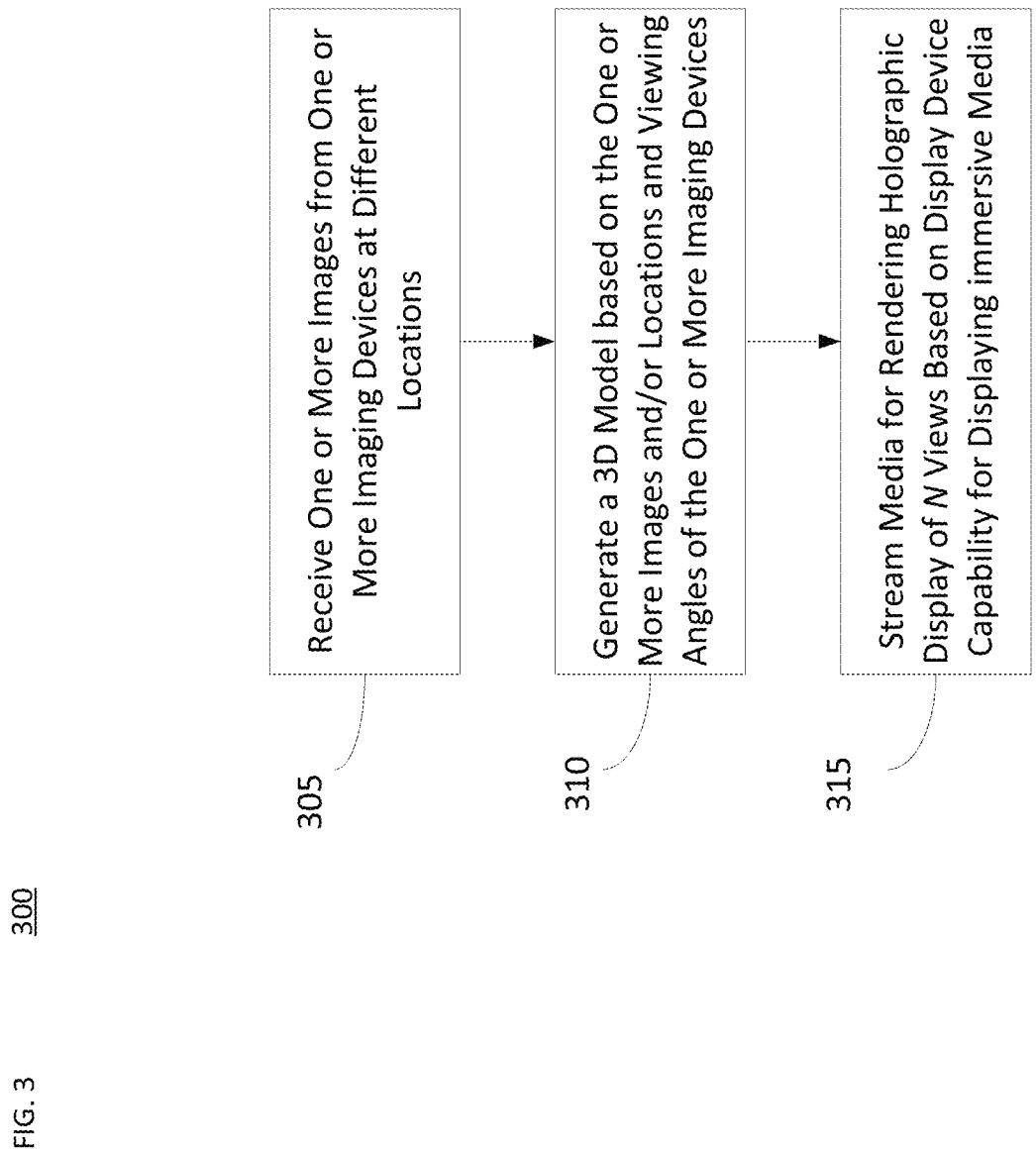
FIG. 3 illustrates a flowchart for generating crowdsourced holographic views, according to an embodiment of the present disclosure.

FIG. 3 illustrates a flowchart for generating crowdsourced holographic views, according to an embodiment of the present disclosure.

As shown in FIG. 3, the process 300 includes at least operations 305-315. At operation 305, one or more images of a same scene may be received from one or more imaging devices wherein each of the one or more imaging devices is at different locations. As an example, one or more images of a scene 107 may be received by the server and/or the media distribution processor from one or more imaging devices 101-106 wherein each of the one or more imaging devices is at different locations.

In some embodiments, the one or more imaging devices may capture the same scene from at least two viewing angles and from at least two distances. In some embodiments, the different locations associated with the one or more imaging devices may be random locations. In some embodiments, the one or more imaging devices may capture the one or more images at one or more synchronized times.

At operation 310, a 3D model of the same scene based on the one or more images may be generated. As an example, the server and/or the media distribution processor may generate the 3D model of the scene 107 based on the one or more images. According to some embodiments, the server and/or the media distribution processor may determine respective locations associated with each of the one or more imaging devices based on at least two sensors of each of the one or more imaging devices. The server and/or the media distribution processor may identify one or more objects captured at different viewing angles in the one or more images. Then server and/or the media distribution processor may align the one or more images based on the one or more objects identified in the one or more images and the locations associated with each of the one or more imaging devices.

According to some embodiments, the at least two sensors may include a position sensor, a proximity sensor, and an orientation sensor.

At operation 315, immersive media for rendering a holographic display of the same scene based on the 3D model may be streamed based on determining that a display device is capable of displaying immersive media. As an example, immersive media for rendering a holographic display of the scene 107 based on the 3D model may be streamed by the server and/or media distribution processor to the display device (also referred to as end device and client device) based on determining that the display device is capable of displaying immersive media. In some embodiments, media for rendering a 2D raster display based on one view of the same scene based on the 3D model may be streamed by the server and/or media distribution processor to the display device based on determining that the display device is incapable of displaying immersive media. In some embodiments, immersive media for rendering the holographic display based on a threshold number of views of the scene 107 based on the 3D model may be streamed by the server and/or media distribution processor to the display device proportional to the determined capability of the display device.

According to an aspect, the one or more images may be preprocessed based on a location of a respective imaging device among the one or more imaging devices. As an example, the one or more images may be preprocessed by the server and/or media distribution processor based on a location of a respective imaging device 101 among the one or more imaging devices 101-106. In some embodiments, the preprocessing may include adjusting a resolution of an image among the one or more images based on the location of the respective imaging device.

Although FIGS. 2-3 show example blocks of processes 200 and 300, in some implementations, processes 200 and 300 may include additional blocks, fewer blocks, different blocks, or differently arranged blocks than those depicted in FIGS. 2-3. Additionally, or alternatively, two or more of the blocks of processes 200 and 300 may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above, can be implemented as computer software using computer-readable instructions, and physically stored in one or more computer-readable media. For example, FIG. 8 shows a computer system 800 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 4:
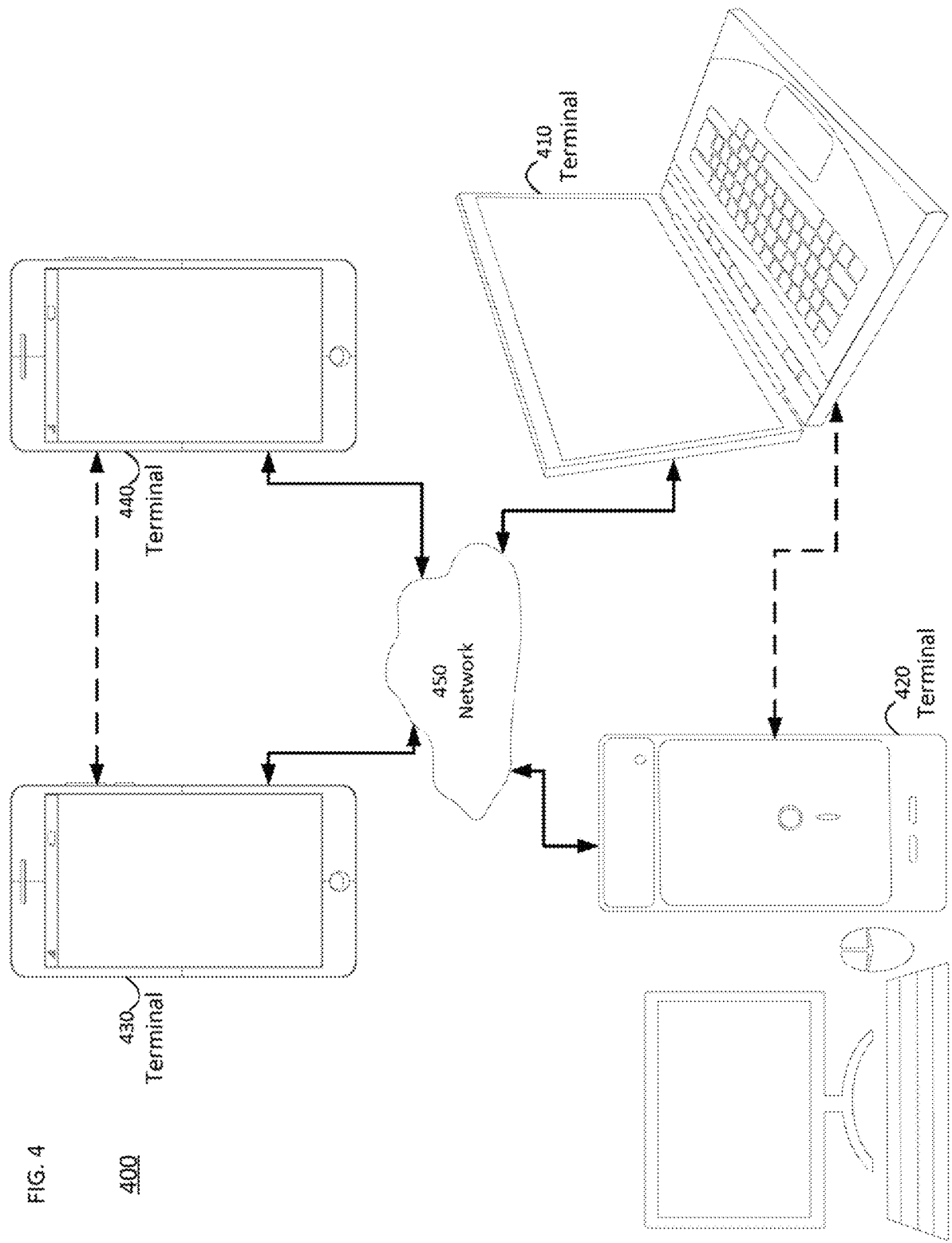
FIG. 4 is a simplified block diagram of a communication system, according to an embodiment of the present disclosure.

FIG. 4 illustrates a simplified block diagram of a communication system 400 according to an embodiment of the present disclosure. The communication system 400 may include at least two terminals 410-420 interconnected via a network 450. For unidirectional transmission of data, a first terminal 410 may code video data at a local location for transmission to the other terminal 420 via the network 450. The second terminal 420 may receive the coded video data of the other terminal from the network 450, decode the coded data, and display the recovered video data. Unidirectional data transmission may be common in media serving applications and the like.

FIG. 4 illustrates a second pair of terminals 430, 440 provided to support bidirectional transmission of coded video that may occur, for example, during videoconferencing. For bidirectional transmission of data, each terminal 430, 440 may code video data captured at a local location for transmission to the other terminal via the network 450. Each terminal 430, 440 also may receive the coded video data transmitted by the other terminal, may decode the coded data and may display the recovered video data at a local display device.

In FIG. 4, the terminals 410-440 may be illustrated as servers, personal computers and smart phones but the principles of the present disclosure are not so limited. Embodiments of the present disclosure find application with laptop computers, tablet computers, media players and/or dedicated video conferencing equipment. The network 450 represents any number of networks that convey coded video data among the terminals 410-440, including for example wireline and/or wireless communication networks. The communication network 450 may exchange data in circuit-switched and/or packet-switched channels. Representative networks include telecommunications networks, local area networks, wide area networks, and/or the Internet. For the purposes of the present discussion, the architecture and topology of the network 450 may be immaterial to the operation of the present disclosure unless explained herein below.

Figure 5:
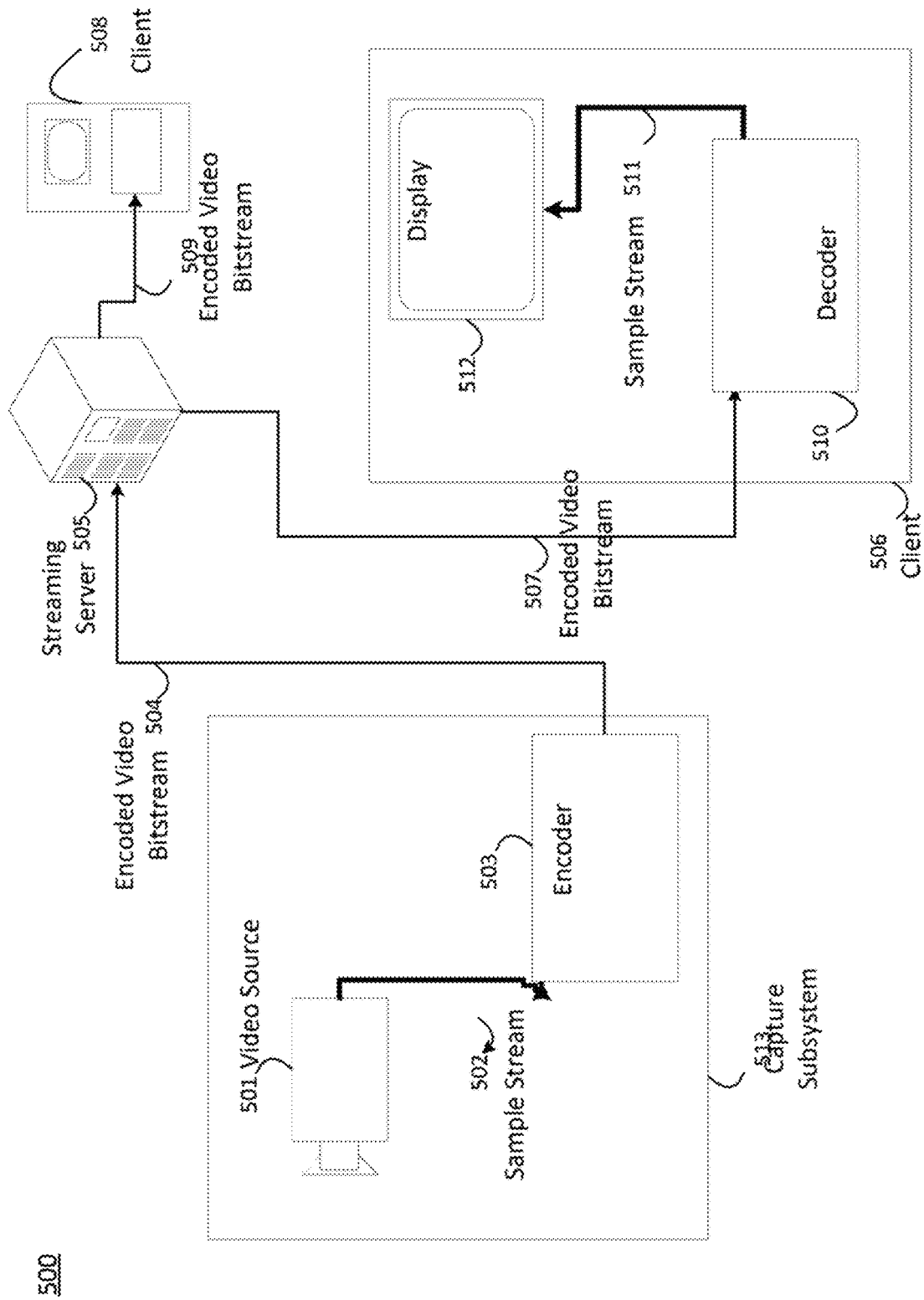
FIG. 5 is a diagram of the placement of a video encoder and decoder in a streaming environment.

FIG. 5 illustrates, as an example for an application for the disclosed subject matter, the placement of a video encoder and decoder in a streaming environment, for example streaming system 500. The disclosed subject matter can be equally applicable to other video enabled applications, including, for example, video conferencing, digital TV, storing of compressed video on digital media including CD, DVD, memory stick and the like, and so on.

A streaming system may include a capture subsystem 513, which can include a video source 501, for example a digital camera, creating, for example, an uncompressed video sample stream 502. That sample stream 502, depicted as a bold line to emphasize a high data volume when compared to encoded video bitstreams, can be processed by an encoder 503 coupled to the video source 501, which may be, for example, a camera as discussed above. The encoder 503 can include hardware, software, or a combination thereof to enable or implement aspects of the disclosed subject matter as described in more detail below. The encoded video bitstream 504, depicted as a thin line to emphasize the lower data volume when compared to the sample stream, can be stored on a streaming server 505 for future use. One or more streaming clients 506, 508 can access the streaming server 505 to retrieve copies 507, 509 of the encoded video bitstream 504. A client 506 can include a video decoder 510, which decodes the incoming copy of the encoded video bitstream 507 and creates an outgoing video sample stream 511 that can be rendered on a display 512 or other rendering device not depicted. In some streaming systems, the video bitstreams 504, 507, 509 can be encoded according to certain video coding/compression standards. Examples of those standards include ITU-T Recommendation H.265. Under development is a video coding standard informally known as Versatile Video Coding (VVC). The disclosed subject matter may be used in the context of VVC.

Figure 6:
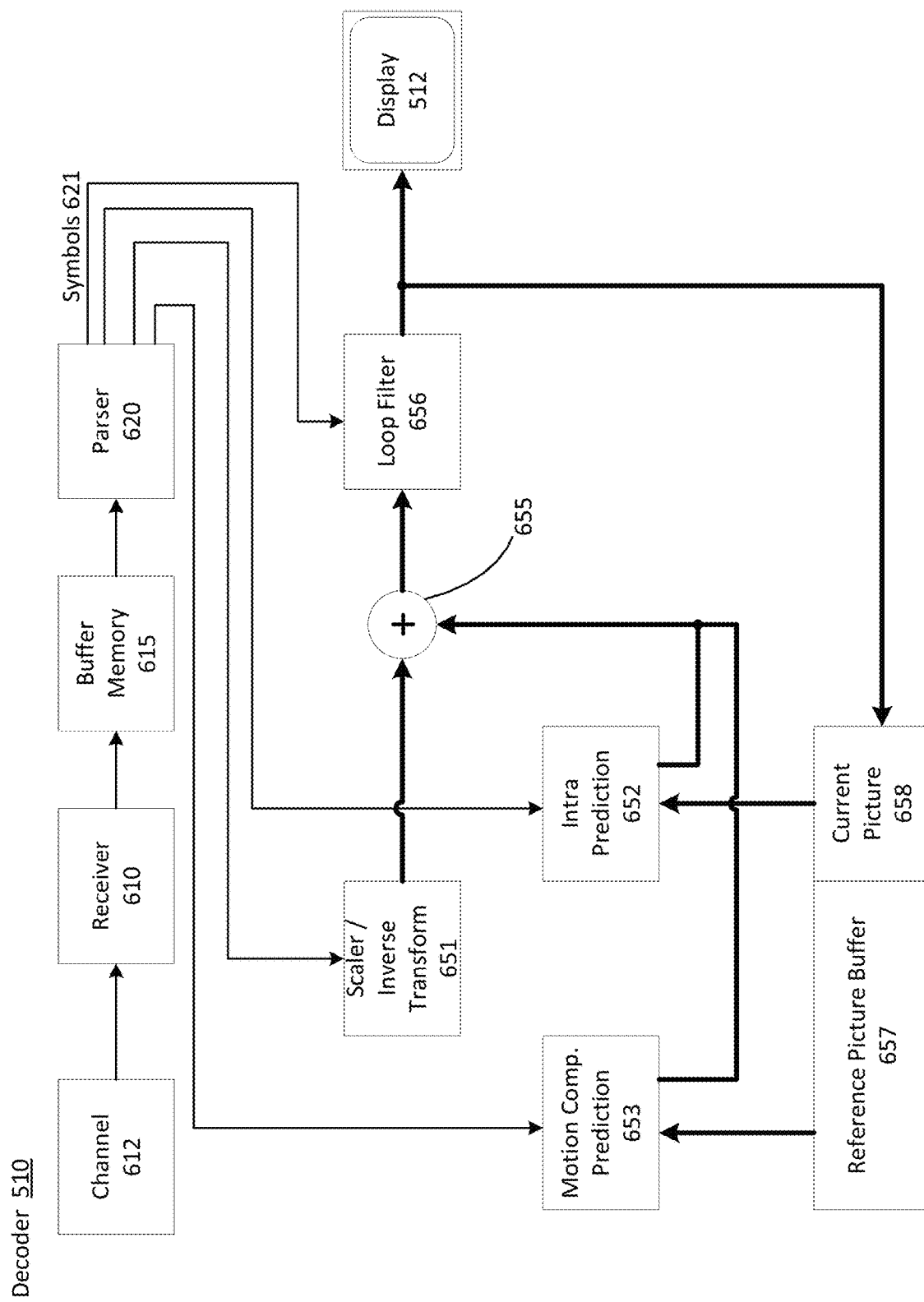
FIG. 6 is a functional block diagram of a video decoder, according to an embodiment of the present disclosure.

FIG. 6 may be a functional block diagram of a video decoder 510 according to an embodiment of the present disclosure.

A receiver 610 may receive one or more codec video sequences to be decoded by the decoder 510; in the same or another embodiment, one coded video sequence at a time, where the decoding of each coded video sequence is independent from other coded video sequences. The coded video sequence may be received from a channel 612, which may be a hardware/software link to a storage device, that stores the encoded video data. The receiver 610 may receive the encoded video data with other data, for example, coded audio data, and/or ancillary data streams, that may be forwarded to their respective using entities not depicted. The receiver 610 may separate the coded video sequence from the other data. To combat network jitter, a buffer memory 615 may be coupled in between receiver 610 and entropy decoder/parser 620 "parser" henceforth. When receiver 610 is receiving data from a store/forward device of sufficient bandwidth and controllability, or from an isosynchronous network, the buffer 615 may not be needed, or can be small. For use on best effort packet networks such as the Internet, the buffer 615 may be required, can be comparatively large, and can advantageously of adaptive size.

The video decoder 510 may include a parser 620 to reconstruct symbols 621 from the entropy coded video sequence. Categories of those symbols include information used to manage operation of the decoder 510, and potentially information to control a rendering device such as a display 512 that is not an integral part of the decoder but can be coupled to it, as was shown in FIG. 6. The control information for the rendering device(s may be in the form of Supplementary Enhancement Information SEI messages or Video Usability Information (VUI) parameter set fragments not depicted. The parser 620 may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser 620 may extract from the coded video sequence, a set of subgroup parameters for at least one of the subgroups of pixels in the video decoder, based upon at least one parameters corresponding to the group. Subgroups can include Groups of Pictures GOPs, pictures, tiles, slices, macroblocks, Coding Units CUs, blocks, Transform Units TUs, Prediction Units PUs and so forth. The entropy decoder/parser may also extract from the coded video sequence information such as transform coefficients, quantizer parameter QP values, motion vectors, and so forth.

The parser 620 may perform entropy decoding/parsing operation on the video sequence received from the buffer 615, so to create symbols 621. The parser 620 may receive encoded data, and selectively decode particular symbols 621. Further, the parser 620 may determine whether the particular symbols 621 are to be provided to a Motion Compensation Prediction unit 653, a scaler/inverse transform unit 651, an Intra Prediction Unit 652, or a loop filter 656.

Reconstruction of the symbols 621 can involve multiple different units depending on the type of the coded video picture or parts thereof such as inter and intra picture, inter and intra block, and other factors. Which units are involved, and how, can be controlled by the subgroup control information that was parsed from the coded video sequence by the parser 620. The flow of such subgroup control information between the parser 620 and the multiple units below is not depicted for clarity.

Beyond the functional blocks already mentioned, decoder 510 can be conceptually subdivided into a number of functional units as described below. In a practical implementation operating under commercial constraints, many of these units interact closely with each other and can, at least partly, be integrated into each other. However, for describing the disclosed subject matter, the conceptual subdivision into the functional units below is appropriate.

A first unit is the scaler/inverse transform unit 651. The scaler/inverse transform unit 651 receives quantized transform coefficient as well as control information, including which transform to use, block size, quantization factor, quantization scaling matrices, etc. as symbol(s 621 from the parser 620. It can output blocks comprising sample values that can be input into aggregator 655.

In some cases, the output samples of the scaler/inverse transform 651 can pertain to an intra coded block; that is: a block that is not using predictive information from previously reconstructed pictures, but can use predictive information from previously reconstructed parts of the current picture. An intra picture prediction unit 652 can provide such predictive information. In some cases, the intra picture prediction unit 652 generates a block of the same size and shape of the block under reconstruction, using surrounding already reconstructed information fetched from the current partly reconstructed picture 658. The aggregator 655, in some cases, adds, on a per sample basis, the prediction information the intra prediction unit 652 has generated to the output sample information as provided by the scaler/inverse transform unit 651.

In other cases, the output samples of the scaler/inverse transform unit 651 can pertain to an inter coded, and potentially motion compensated block. In such a case, a Motion Compensation Prediction unit 653 can access reference picture memory 657 to fetch samples used for prediction. After motion compensating the fetched samples in accordance with the symbols, the aggregator 655 to the output of the scaler/inverse can add 621 pertaining to the block, these samples transform unit in this case called the residual samples or residual signal so to generate output sample information. The addresses within the reference picture memory form where the motion compensation unit fetches prediction samples can be controlled by motion vectors, available to the motion compensation unit in the form of symbols 621 that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator 655 can be subject to various loop-filtering techniques in the loop filter unit 656. Video compression technologies can include in-loop filter technologies that are controlled by parameters included in the coded video bitstream and made available to the loop filter unit 656 as symbols 621 from the parser 620, but can also be responsive to meta-information obtained during the decoding of previous in decoding order parts of the coded picture or coded video sequence, as well as responsive to previously reconstructed and loop-filtered sample values.

The output of the loop filter unit 656 can be a sample stream that can be output to the render device 512 as well as stored in the reference picture memory 658 for use in future inter-picture prediction.

Certain coded pictures, once fully reconstructed, can be used as reference pictures for future prediction. Once a coded picture is fully reconstructed and the coded picture has been identified as a reference picture by, for example, parser 620), the current reference picture 658 can become part of the reference picture buffer 657, and a fresh current picture memory can be reallocated before commencing the reconstruction of the following coded picture.

The video decoder 510 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate measured in, for example mega samples per second, maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver 610 may receive additional redundant data with the encoded video. The additional data may be included as part of the coded video sequence(s. The additional data may be used by the video decoder 510 to properly decode the data and/or to more accurately reconstruct the original video data. Additional data can be in the form of, for example, temporal, spatial, or signal-to-noise ratio SNR enhancement layers, redundant slices, redundant pictures, forward error correction codes, and so on.

Figure 7:
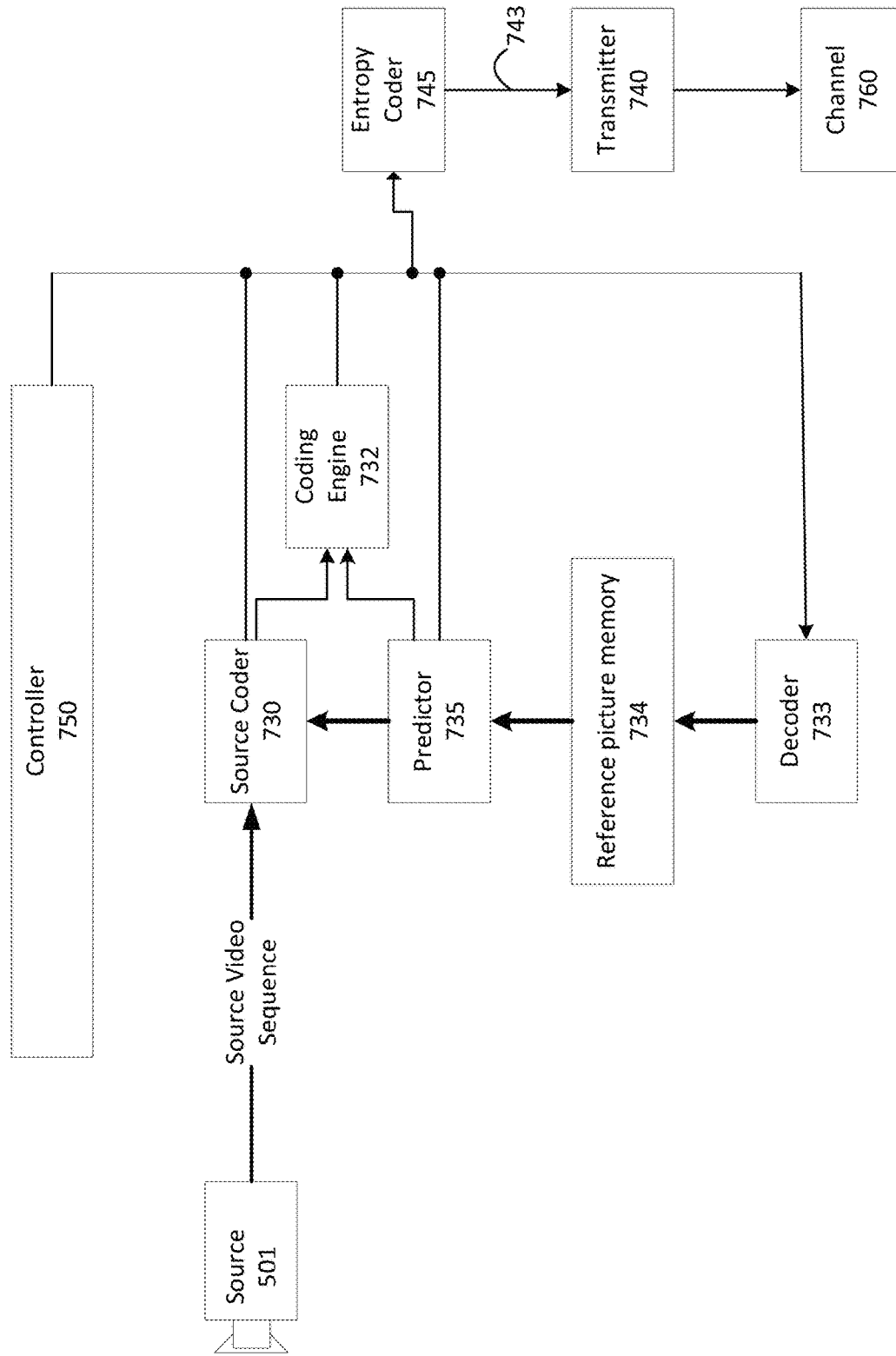
FIG. 7 is a functional block diagram of a video encoder, according to an embodiment of the present disclosure.

FIG. 7 may be a functional block diagram of a video encoder 503 according to an embodiment of the present disclosure.

The encoder 503 may receive video samples from a video source 501 that is not part of the encoder that may capture video images to be coded by the encoder 503.

The video source 501 may provide the source video sequence to be coded by the encoder 503 in the form of a digital video sample stream that can be of any suitable bit depth for example: 8 bit, 10 bit, 12 bit, . . . , any colorspace for example, BT.601 Y CrCB, RGB, . . . and any suitable sampling structure for example Y CrCb 4:2:0, Y CrCb 4:4:4. In a media serving system, the video source 501 may be a storage device storing previously prepared video. In a videoconferencing system, the video source 501 may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder 503 may code and compress the pictures of the source video sequence into a coded video sequence 743 in real time or under any other time constraints as required by the application. Enforcing appropriate coding speed is one function of Controller 750. Controller controls other functional units as described below and is functionally coupled to these units. The coupling is not depicted for clarity. Parameters set by controller can include rate control related parameters picture skip, quantizer, lambda value of rate-distortion optimization techniques, . . . , picture size, group of pictures GOP layout, maximum motion vector search range, and so forth. A person skilled in the art can readily identify other functions of controller 750 as they may pertain to video encoder 503 optimized for a certain system design.

Some video encoders operate in what a person skilled in the art readily recognizes as a "coding loop." As an oversimplified description, a coding loop can consist of the encoding part of an encoder 730 "source coder" henceforth responsible for creating symbols based on an input picture to be coded, and a reference picture(s), and a local decoder 733 embedded in the encoder 503 that reconstructs the symbols to create the sample data that a remote decoder also would create as any compression between symbols and coded video bitstream is lossless in the video compression technologies considered in the disclosed subject matter. That reconstructed sample stream is input to the reference picture memory 734. As the decoding of a symbol stream leads to bit-exact results independent of decoder location local or remote, the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity and resulting drift, if synchronicity cannot be maintained, for example because of channel errors is well known to a person skilled in the art.

The operation of the "local" decoder 733 can be the same as of a "remote" decoder 510, which has already been described in detail above in conjunction with FIG. 6. Briefly referring also to FIG. 7, however, as symbols are available and en/decoding of symbols to a coded video sequence by entropy coder 745 and parser 620 can be lossless, the entropy decoding parts of decoder 510, including channel 612, receiver 610, buffer 615, and parser 620 may not be fully implemented in local decoder 733.

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder 730 may perform motion compensated predictive coding, which codes an input frame predictively with reference to one or more previously-coded frames from the video sequence that were designated as "reference frames." In this manner, the coding engine 732 codes differences between pixel blocks of an input frame and pixel blocks of reference frame(s that may be selected as prediction reference(s to the input frame.

The local video decoder 733 may decode coded video data of frames that may be designated as reference frames, based on symbols created by the source coder 730. Operations of the coding engine 732 may advantageously be lossy processes. When the coded video data may be decoded at a video decoder not shown in FIG. 7, the reconstructed video sequence typically may be a replica of the source video sequence with some errors. The local video decoder 733 replicates decoding processes that may be performed by the video decoder on reference frames and may cause reconstructed reference frames to be stored in the reference picture memory 734, which may be for example a cache. In this manner, the encoder 503 may store copies of reconstructed reference frames locally that have common content as the reconstructed reference frames that will be obtained by a far-end video decoder absent transmission errors.

The predictor 735 may perform prediction searches for the coding engine 732. That is, for a new frame to be coded, the predictor 735 may search the reference picture memory 734 for sample data as candidate reference pixel blocks or certain metadata such as reference picture motion vectors, block shapes, and so on, that may serve as an appropriate prediction reference for the new pictures. The predictor 735 may operate on a sample block-by-pixel block basis to find appropriate prediction references. In some cases, as determined by search results obtained by the predictor 735, an input picture may have prediction references drawn from multiple reference pictures stored in the reference picture memory 734.

The controller 750 may manage coding operations of the video coder 730, including, for example, setting of parameters and subgroup parameters used for encoding the video data.

Output of all aforementioned functional units may be subjected to entropy coding in the entropy coder 745. The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter 740 may buffer the coded video sequence(s as created by the entropy coder 745 to prepare it for transmission via a communication channel 760, which may be a hardware/software link to a storage device which would store the encoded video data. The transmitter 740 may merge coded video data from the video coder 730 with other data to be transmitted, for example, coded audio data and/or ancillary data streams sources not shown.

The controller 750 may manage operation of the encoder 503. During coding, the controller 750 may assign to each coded picture a certain coded picture type, which may affect the coding techniques that may be applied to the respective picture. For example, pictures often may be assigned as one of the following frame types:

An Intra Picture I picture may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture P picture may be one that may be coded and decoded using intra prediction or inter prediction using at most one motion vector and reference index to predict the sample values of each block.

A Bi-directionally Predictive Picture B Picture may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks for example, blocks of 4×4, 8×8, 4×8, or 16×16 samples each and coded on a block-by-block basis. Blocks may be coded predictively with reference to other already coded blocks as determined by the coding assignment applied to the blocks' respective pictures. For example, blocks of I pictures may be coded nonpredictively or they may be coded predictively with reference to already coded blocks of the same picture spatial prediction or intra prediction. Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video encoder 503 may perform coding operations according to a predetermined video coding technology or standard, such as ITU-T Rec. H.265. In its operation, the video encoder 503 may perform various compression operations, including predictive coding operations that exploit temporal and spatial redundancies in the input video sequence. The coded video data, therefore, may conform to a syntax specified by the video coding technology or standard being used.

In an embodiment, the transmitter 740 may transmit additional data with the encoded video. The video encoder 730 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

The components shown in FIG. 8 for computer system 800 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 800.

Computer system 800 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 801, mouse 802, trackpad 803, touch screen 810, joystick 805, microphone 806, scanner 807, camera 808.

Computer system 800 may also include certain human interface output devices. Such human interface output devices may be stimulating the senses of one or more human users through, for example, tactile output, sound, light, and smell/taste. Such human interface output devices may include tactile output devices (for example tactile feedback by the touch screen 810, data-glove 1204, or joystick 805, but there can also be tactile feedback devices that do not serve as input devices), audio output devices (such as: speakers 809, headphones (not depicted)), visual output devices (such as screens 810 to include cathode ray tube (CRT) screens, liquid-crystal display (LCD) screens, plasma screens, organic light-emitting diode (OLED) screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 800 can also include human accessible storage devices and their associated media such as optical media including CD/DVD ROM/RW 820 with CD/DVD or the like media 821, thumb-drive 822, removable hard drive or solid state drive 823, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 800 can also include interface to one or more communication networks 855. Networks 855 can for example be wireless, wireline, optical. Networks 855 can further be local, wide-area, metropolitan, vehicular and industrial, real-time, delay-tolerant, and so on. Examples of networks 855 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 855 commonly require external network interface adapters 854) that attached to certain general purpose data ports or peripheral buses 849 (such as, for example USB ports of the computer system 800; others are commonly integrated into the core of the computer system 800 by attachment to a system bus as described below (for example Ethernet interface into a PC computer system or cellular network interface into a smartphone computer system). Using any of these networks 855, computer system 800 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks 855 and network interfaces 854 as described above.

Aforementioned human interface devices, human-accessible storage devices, and network interfaces can be attached to a core 840 of the computer system 800.

The core 840 can include one or more Central Processing Units (CPU) 841, Graphics Processing Units (GPU) 842, specialized programmable processing units in the form of Field Programmable Gate Areas (FPGA) 843, hardware accelerators for certain tasks, for example accelerator 844, and so forth. These devices, along with Read-only memory (ROM) 845, Random-access memory (RAM) 846, internal mass storage such as internal non-user accessible hard drives, solid-state drives (SSDs), and the like 847, may be connected through a system bus 899. In some computer systems, the system bus 899 can be accessible in the form of one or more physical plugs to enable extensions by additional CPUs, GPU, and the like. The peripheral devices can be attached either directly to the core's system bus 899, or through a peripheral bus 849. Architectures for a peripheral bus include peripheral component interconnect (PCI), USB, and the like.

CPUs 841, GPUs 842, FPGAs 843, and accelerators 844 can execute certain instructions that, in combination, can make up the aforementioned computer code. That computer code can be stored in ROM 845 or RAM 846. Transitional data can be also be stored in RAM 846, whereas permanent data can be stored for example, in the internal mass storage 847. Fast storage and retrieve to any of the memory devices can be enabled through the use of cache memory, that can be closely associated with one or more CPU 841, GPU 842, mass storage 847, ROM 845, RAM 846, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system 800 having an architecture as illustrated, and specifically the core 840 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 840 that are of non-transitory nature, such as core-internal mass storage 847 or ROM 845. The software implementing various embodiments of the present disclosure can be stored in such devices and executed by core 840. A computer-readable medium can include one or more memory devices or chips, according to particular needs. The software can cause the core 840 and specifically the processors therein (including CPU, GPU, FPGA, and the like) to execute particular processes or particular parts of particular processes described herein, including defining data structures stored in RAM 846 and modifying such data structures according to the processes defined by the software. In addition or as an alternative, the computer system can provide functionality as a result of logic hardwired or otherwise embodied in a circuit (for example: accelerator 844), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method for generating crowdsourced holographic views, the method being executed by at least one processor, the method comprising:
   receiving, from a first set of imaging devices, one or more two-dimensional (2D) images of a same scene, with the first set of imaging devices being selected from one or more imaging devices, the first set of devices being located at random positions further than a threshold distance from the same scene;
   obtaining a first number of 2D views by adjusting resolutions of respective images from among the one or more 2D images such that the one or more 2D images appear to be from a same distance from the scene;
   generating a 3D model of the same scene based on aligning the first number of 2D views using sample points in each image among the one or more 2D images;
   based on determining that a display device is incapable of displaying immersive media, stream media for rendering a 2D raster display based on one view of the first number of 2D views of the same scene; and
   based on determining that the display device is capable of displaying immersive media and based on a capability of the display device, stream immersive media for rendering the holographic display with the immersive media being custom generated using a specific number of views among the first number of 2D views and the 3D model, with the specific number of views being based on the capability of the display device and with the specific number of views being less than the first number of 2D views.

2. The method of claim 1, wherein the one or more imaging devices capture the same scene from at least two viewing angles and from at least two distances.

3. The method of claim 1, wherein the one or more imaging devices capture the one or more 2D images at one or more synchronized times.

4. The method of claim 1, wherein the different locations associated with the one or more imaging devices are random locations.

5. The method of claim 1, wherein obtaining a first number of 2D views comprises:
   determining respective locations associated with each of the one or more imaging devices based on at least two sensors of each of the one or more imaging devices;
   identifying one or more objects captured at different viewing angles in the one or more 2D images; and
   aligning the one or more 2D images based on the one or more objects identified in the one or more 2D images.

6. The method of claim 5, wherein the at least two sensors include a position sensor, a proximity sensor, and an orientation sensor.

7. The method of claim 1, wherein the method further comprises:
   generating a vector scene with polygonal representations of one or more objects in the same scene based on aligning and matching the one or more objects; and
   generating a crowdsourced holographic view based on the vector scene.

8. The method of claim 1, wherein the method further comprises preprocessing the one or more 2D images based on a location of a respective imaging device among the one or more imaging devices.

9. An apparatus for generating crowdsourced holographic views, the apparatus comprising:
   at least one memory configured to store program code; and
   at least one processor configured to read the program code and operate as instructed by the program code, the program code including:
      receiving code configured to cause the at least one processor to receive, from a first set of imaging devices, one or more 2D images of a same scene, with the first set of imaging devices being selected from one or more imaging devices, the first set of devices being located at random positions further than a threshold distance from the same scene;
      obtaining code configured to cause the at least one processor to obtain a first number of 2D views by adjusting resolutions of respective images from among the one or more 2D images such that the one or more 2D images appear to be from a same distance from the scene;

first generating code configured to cause the at least one processor to generate a 3D model of the same scene based on aligning the first number of 2D views using sample points in each image among the one or more 2D images;

first streaming code configured to cause the at least one processor to stream, based on determining that a display device is incapable of displaying immersive media, media for rendering a 2D raster display based on one view of the first number of 2D views of the same scene; and second streaming code configured to cause the at least one processor to stream, based on determining that the display device is capable of displaying immersive media and based on a capability of the display device, immersive media for rendering the holographic display with the immersive media being custom generated using a specific number of views among the first number of 2D views and the 3D model, with the specific number of views being based on the capability of the display device and with the specific number of views being less than the first number of 2D views.

10. The apparatus of claim 9, wherein the one or more imaging devices capture the same scene from at least two viewing angles and from at least two distances.

11. The apparatus of claim 9, wherein the one or more imaging devices capture the one or more 2D images at one or more synchronized times.

12. The apparatus of claim 9, wherein the different locations associated with the one or more imaging devices are random locations.

13. The apparatus of claim 9, wherein the first obtaining code comprises:

second determining code configured to cause the at least one processor to determine respective locations associated with each of the one or more imaging devices based on at least two sensors of each of the one or more imaging devices;

identifying code configured to cause the at least one processor to identify one or more objects captured at different viewing angles in the one or more 2D images; and aligning code configured to cause the at least one processor to align the one or more 2D images based on the one or more objects identified in the one or more 2D images.

14. The apparatus of claim 9, wherein the program code further comprises:

second generating code configured to cause the at least one processor to generate a vector scene with polygonal representations of one or more objects in the same scene based on aligning and matching the one or more objects; and third generating code configured to cause the at least one processor to generate a crowdsourced holographic view based on the vector scene.

15. A non-transitory computer-readable medium storing instructions, the instructions comprising: one or more instructions that, when executed by one or more processors of a device for generating crowdsourced holographic views, cause the one or more processors to:

receive, from a first set of imaging devices, one or more 2D images of a same scene, with the first set of imaging devices being selected from one or more imaging devices, the first set of devices being located at random positions further than a threshold distance from the same scene;

obtain a first number of 2D views by adjusting resolutions of respective images from among the one or more 2D images such that the one or more 2D images appear to be from a same distance from the scene;

generate a 3D model of the same scene based on aligning the first number of 2D views using sample points in each image among the one or more 2D images;

based on determining that a display device is incapable of displaying immersive media, stream media for rendering a 2D raster display based on one view of the first number of views of the same scene; and based on determining that the display device is capable of displaying immersive media and based on a capability of the display device, stream immersive media for rendering the holographic display with the immersive media being custom generated using a specific number of views among the first number of 2D views and the 3D model, with the specific number of views being based on the capability of the display device and with the specific number of views being less than the first number of 2D views.

16. The non-transitory computer-readable medium of claim 15, wherein obtaining a first number of 2D views comprises:

determine respective locations associated with each of the one or more imaging devices based on at least two sensors of each of the one or more imaging devices;

identify one or more objects captured at different viewing angles in the one or more 2D images; and align the one or more 2D images based on the one or more objects identified in the one or more 2D images.

17. The non-transitory computer-readable medium of claim 15, wherein the instructions further comprise preprocessing the one or more 2D images based on a location of a respective imaging device among the one or more imaging devices.

* * * * *